United States Patent [19]

Bobsein et al.

[11] Patent Number: 5,179,193

[45] Date of Patent: Jan. 12, 1993

[54] BRANCHED AROMATIC SULFIDE SULFONE POLYMER PRODUCTION

[75] Inventors: Rex L. Bobsein; Howard F. Efner, both of Bartlesville, Okla.

[73] Assignee: Phillips Petroleum Company, Bartlesville, Okla.

[21] Appl. No.: 789,554

[22] Filed: Nov. 8, 1991

[51] Int. Cl.$^5$ .............................................. C08G 75/16
[52] U.S. Cl. .................................. 528/388; 528/171; 528/174
[58] Field of Search ................... 528/388, 171, 174

[56] References Cited

U.S. PATENT DOCUMENTS

| | | | |
|---|---|---|---|
| 3,960,815 | 6/1976 | Darsow et al. | 260/49 |
| 4,127,713 | 11/1978 | Campbell | 528/391 |
| 4,282,347 | 8/1981 | Tieszen et al. | 528/388 |
| 4,525,579 | 1/1985 | Idel et al. | 528/388 |
| 4,774,276 | 9/1988 | Bobsein et al. | 524/399 |
| 4,808,698 | 2/1989 | Bobsein et al. | 528/388 |

*Primary Examiner*—Harold D. Anderson
*Attorney, Agent, or Firm*—A. W. Umphlett

[57] ABSTRACT

Branched aromatic sulfide sulfone polymer is produced by contacting at least one dihalo aromatic sulfone, at least one polymerizable sulfur source other than lithium sulfide, at least one alkali metal carbonate, at least one organic amide, at least one alkali metal carboxylate, at least one polyhalodiarylsulfone having more than two halogen substituents and water including water of hydration under polymerization conditions for a period of time sufficient to form an aromatic sulfide sulfone polymer. The polymer exhibits higher melt and solution viscosity than obtained in the same process except without the use in the reaction mixture of polyhalodiarylsulfone having more than two halogen substituents and is useful in the production of coatings, films, molded objects, and fibers.

22 Claims, No Drawings

BRANCHED AROMATIC SULFIDE SULFONE POLYMER PRODUCTION

This invention relates to the production of polymer from aromatic compounds. In one of its aspects this invention relates to the production of branched aromatic sulfide sulfone polymer. In accordance with another aspect, this invention relates to a process for the production of branched aromatic sulfide sulfone polymer by contacting dihalo aromatic sulfone, alkali metal carbonate, a polymerizable sulfur source, organic amide, alkali metal carboxylate, polyhalodiarylsulfone having more than two halogen substituents and a sufficient amount of water including water of hydration to produce a branched polymer which thereby has higher melt and solution viscosity than obtained without the presence of the polyhalodiarylsulfone.

In accordance with a further aspect, this invention relates to the production of p-phenylene sulfide sulfone polymer of increased melt and solution viscosity by contacting bis(p-halophenyl)sulfone, alkali metal carbonate, a selected polymerizable sulfur source, organic amide, alkali metal carboxylate, polyhalodiarylsulfone having more than two halogen substituents and water under polymerization conditions including elevated temperature and a period of time sufficient to form branched aromatic sulfide sulfone polymer of increased melt and solution viscosity as compared to polymer prepared without the presence of the polyhalodiarylsulfone.

In recent years, a wide variety of high polymer has been prepared, much of which is currently being produced and marketed on a large scale. While such polymer is useful in many areas, one property of high polymer, particularly the thermoplastic type, which needs to be improved is the ability to withstand high temperatures. Since thermoplastic material can be molded rapidly and efficiently into almost any desired shape, it lends itself to mass production. High polymer, especially a thermoplastic material, which will stand very high temperatures and can be used in such areas as electrical components, wire coatings, automatic parts, and the like has been the objective of a great deal of research.

This invention provides branched aromatic sulfide sulfone polymer of high melt and solution viscosity and a novel process for the production of this polymer. Such polymer can be more desirable as molding resin than is aromatic sulfide sulfone polymer of lower melt and solution viscosity since some properties of the product molded from polymer of higher melt and solution viscosity can be superior for certain uses to product molded from polymer of lower melt and solution viscosity.

Accordingly, an object of this invention is to produce branched aromatic sulfide sulfone polymer exhibiting higher melt and solution viscosity than is obtained without the presence of the polyhalodiarylsulfone in the polymerization mixture.

Another object of this invention is to provide a process for producing high melt and solution viscosity, branched aromatic sulfide sulfone polymer exhibiting good melt processing properties.

Other objects, aspects, and the several advantages of this invention will be apparent on a study of this disclosure and the appended claims.

In accordance with this invention, branched aromatic sulfide sulfone polymer is produced by contacting at least one dihaloaromatic sulfone, at least one polymerizable sulfur source, at least one alkali metal carbonate, at least one organic amide, at least one alkali metal carboxylate, at least one polyhalodiarylsulfone having more than two halogen substituents and water including water of hydration under polymerization conditions for a period of time sufficient to form an aromatic sulfide sulfone polymer exhibiting higher melt and solution viscosity than obtained without the use of polyhalodiarylsulfone having more than two halogen substituents in the reaction mixture.

In accordance with one specific embodiment of the present invention, a reaction mixture of at least one dihalo aromatic sulfone, such as a bis(p-halophenyl)sulfone; at least one polyhalodiarylsulfone having more than two halogen substituents, such as 3,3',4,4'-tetrachloro diphenyl sulfone; at least one polymerizable sulfur source; at least one alkali metal carbonate, such as sodium carbonate; at least one organic amide, such as N-methyl-2-pyrrolidone; at least one alkali metal carboxylate, such as sodium acetate, and water, including water of hydration employed under polymerization conditions including a period of time at a temperature sufficient to form a branched aromatic sulfide sulfone polymer exhibiting higher melt and solution viscosity than obtained with the same reaction mixture excluding polyhalodiarylsulfone.

In the present invention, at least one dihalo aromatic sulfone, at least one polymerizable sulfur source, at least one alkali metal carbonate, at least one inorganic amide, at least one alkali metal carboxylate, at least one polyhalodiarylsulfone having more than two halogen substituents and water are contacted for a period of time at an elevated temperature with proportions of reactants sufficient to cause the reactants to react with each other to form a branched aromatic sulfide sulfone polymer exhibiting melt and solution viscosity greater than obtained under the same conditions with the exception of using polyhalodiarylsulfone having more than two halogen substituents.

Dihalo aromatic sulfones that can be employed in the process of this invention can be represented by the formula:

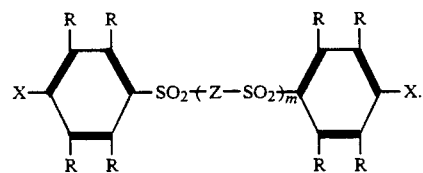

Where each X is selected from the group consisting of fluorine, chlorine, bromine, and iodine; Z is a divalent radical selected from the group consisting of

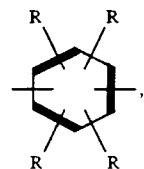

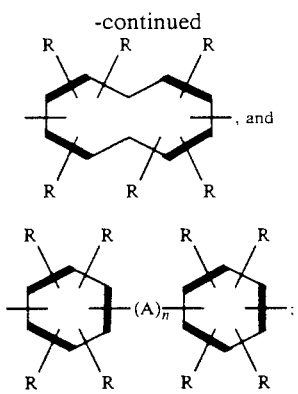

m is 0 or 1; n is 0 or 1; A is selected from the group consisting of oxygen, sulfur, sulfonyl, and $CR_2$ and each R is selected from the group consisting of hydrogen and alkyl radicals having 1 to about 4 carbon atoms, the total number of carbon atoms in all of the R groups in the molecular being 0 to about 12. Preferably, m is 0.

Examples of some dihalo aromatic sulfones that can be employed in the process of this invention include bis(p-fluorophenyl) sulfone, bis(p-chlorophenyl) sulfone, bis(p-bromophenyl) sulfone, bis(p-iodophenyl) sulfone, p-chlorophenyl p-bromophenyl sulfone, p-iodophenyl-3-methyl-4-fluorophenyl sulfone bis(2-methyl-4-chlorophenyl) sulfone, bis(2,5-diethyl-4-bromophenyl) sulfone, bis(3-isopropyl-4-iodophenyl) sulfone, bis(2,5-dipropyl-4-chlorophenyl) sulfone, bis(2-butyl-4-fluorophenyl) sulfone, bis(2,3,5,6-tetramethyl-4-chlorophenyl) sulfone, 2-isobutyl-4-chlorophenyl-3-butyl 4-bromophenyl sulfone, 1,4-bis(chlorophenylsulfonyl)benzene, 1-methyl-2,4-bis(p-fluorophenylsulfonyl)benzene, 2,6-bis(p-bromophenylsulfonyl)naphthalene, 7-ethyl-1,5-bis(p-iodophenylsulfonyl)naphthalene, 4,4'-bis(p-chlorophenylsulfonyl)biphenyl, bis[p-(p-bromophenylsulfonyl)phenyl] ether, bis[p-(p-chlorophenylsulfonyl)phenyl] sulfide, bis[p-(p-chlorophenylsulfonyl)phenyl] sulfone, bis[p-(p-bromophenylsulfonyl)phenyl]methane, 5,5-bis[3-ethyl-4-(p-chlorophenylsulfonyl)phenyl]nonane, and the like, and mixtures thereof.

The polymerizable sulfur source employed that can be employed in the process of this invention includes, among others, alkali metal sulfides such as sodium sulfide, lithium sulfide, potassium sulfide, rubidium sulfide, cesium sulfide, and mixtures thereof and alkali metal hydrosulfides such as sodium hydrosulfide, lithium hydrosulfide, potassium hydrosulfide, rubidium hydrosulfide, cesium hydrosulfide, and mixtures thereof. The alkali metal sulfides and alkali metal hydrosulfides can be used in anhydrous form, as a hydrate, or as an aqueous mixture. Preferably, the alkali metal sulfide used and the alkali metal hydrosulfide used are employed in hydrated form.

The organic amides that can be used in the process of this invention should be substantially liquid at the reaction temperatures and pressures employed. The amides can be cyclic or acyclic and can have 1 to about 10 carbon atoms per molecule. Examples of some suitable amides include formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone, ε-caprolactam-N-methyl-ε-caprolactam, N,N'-ethylenedi-2-pyrrolidone, hexamethylphosphoramide, tetramethylurea, thiopyrrolidone and the like, and mixtures thereof.

Alkali metal carboxylates which can be employed in the process of this invention can be represented by the formula $R'CO_2Na$, where R' is a hydrocarbyl radical selected from alkyl, cycloalkyl, and aryl, and combinations thereof, such as alkaryl, aralkyl, and the like, and the number of carbon atoms in R' is within the range of 1 to about 20. If desired, the alkali metal carboxylate can be employed as a hydrate or as a solution or dispersion in water.

Among the alkali metal carboxylates which can be employed in the process of this invention are: alkali metal acetate, alkali metal propionate, alkali metal 2-methylpropionate, alkali metal butyrate, alkali metal valerate, alkali metal hexanoate, alkali metal heptanoate, alkali metal 2-methyloctanoate, alkali metal dodecanoate, alkali metal 4-ethyltetradecanoate, alkali metal octadecanoate, alkali metal beneicosanoate, alkali metal cyclohexanecarboxylate, alkali metal cyclododecanecarboxylate, alkali metal 3-methylcyclopentanecarboxylate, alkali metal cyclohexylacetate, alkali metal benzoate, alkali metal m-toluate, alkali metal phenylacetate, alkali metal 4-phenylcyclohexanecarboxylate, alkali metal p-tolylacetate, alkali metal 4-ethylcyclohexylacetate, and the like, and the mixtures thereof in which the alkali metals are chosen from among sodium, lithium, potassium, rubidium and cesium.

Alkali metal carbonates are employed in the reaction mixture. Among the alkali metal carbonates useful in the invention are sodium carbonate, lithium carbonate, potassium carbonate, rubidium carbonate, cesium carbonate and mixtures thereof.

The polyhalodiarylsulfones useful in this invention can have chlorine, bromine, fluorine and iodine and mixtures thereof as the halogen constituents. Among the polyhalodiarylsulfones that can be used as branching agents in the process of this invention are: 3,3',4,4'-tetrachlorodiphenyl sulfone, 2,5,4'-trichlorodiphenyl sulfone, 2,4,4'-trichlorodiphenyl sulfone, 3,4,4'-trichlorodiphenyl sulfone and mixtures thereof.

As indicated above, water can be employed as such, and/or it can be added as a hydrate of, and/or as a medium for polymerizable sulfur source and/or alkali metal carboxylate. The amount of water used is set out herein in terms of moles organic amide per mole of water and follows the system set out in U.S. Pat. No. 4,808,698, incorporated here by reference, in which it was found that using a molar ratio of organic amide to polymerizable sulfur source in the range of from about 2:1 to about 24:1, preferably about 4:1 to about 16:1, the organic amide to water molar ratio was best selected from within the range of about 0.4:1 to about 1.3:1, preferably about 0.5:1 to about 1:1, to provide aromatic sulfide/sulfone polymers of high molecular weight as reflected by the inherent viscosity values of the polymers.

Although the mole ratio of dihaloaromatic sulfone to polymerizable sulfur source can vary over a considerable range, generally it will be within the range of about 0.9:1 to about 2:1, preferably about 0.95:1 to about 1.2:1. The mole ratio of alkali metal carboxylate to polymerizable sulfur source can vary over a wide range but generally will be within the range of about 0.05:1 to about 4:1, preferably about 0.1:1 to about 2:1. Although the mole ratio of organic amide to polymerizable sulfur source can vary greatly, generally it will be within the range of about 2:1 to about 24:1, preferably about 4:1 to about 16:1. The mole ratio of alkali metal carbonate to polymerizable sulfur source will be within the range of about 1:1 to about 3:1. preferably about 1.5:1 to about 2.5:1. The mole ratio of polyhalodiarylsulfone having more than two halogen substituents to polymerizable sulfur source can also vary but will generally be within the range of about 0.00001:1 to about 0.1:1, preferably about 0.00005:1 to about 0.05:1. The order of addition of the components of the reaction mixture is not critical.

Although the reaction temperature at which the polymerization is conducted can vary over a considerable range, generally it will be within the range of about 160° C. to about 230° C., preferably about 170° C. to about 210° C. The reaction time can vary widely, depending in part on the reaction temperature, but generally will be within the range of about 10 minutes to about 3 days, preferably about 1 hour to about 8 hours. The pressure should be sufficient to maintain the dihalo aromatic sulfone and the organic amide substantially in the liquid phase.

The aromatic sulfide sulfone polymers produced by the process of this invention can be separated from the reaction mixture by conventional procedures, e.g., by filtration of the polymer, followed by washing with water, or by dilution of the reaction mixture with water, followed by filtration and water washing of the polymer. If desired, at least a portion of the washing with water can be conducted at an elevated temperature, e.g., up to about 250° C. Water-miscible solvents such as acetone or methanol can be used to assist in the washing with water, if desired.

The aromatic sulfide sulfone polymers recovered from the reaction mixture in the process of this invention can suitably be treated to enhance the melt stability of the polymer according to the method for contacting with a zinc source as set out in U.S. Pat. No. 4,774,276 of Rex L. Bobsein et al, incorporated here by reference.

The aromatic sulfide sulfone polymers produced by the process of this invention can be blended with fillers, pigments, extenders, other polymers, and the like. They can be cured through crosslinking and/or chain extension e.g., by heating at temperatures up to about 480° C., in the presence of free oxygen containing gas, to provide cured products having high thermal stability and good chemical resistance. They are useful in the production of coatings, films, molded objects, and fibers.

EXAMPLE I

This is a comparative example in which the process of the invention is carried out with the exception of adding a branching agent into the reaction mixture. In each of runs 1-6 of this example the process of run 1, shown below, was followed with minor exceptions as will be set out in Table I that follows this example.

A one liter, stirred, 316 stainless steel autoclave was charged with 1.50 moles of bis(chlorophenyl) sulfone (BCPS), 1.50 moles of sodium bisulfide (NaSH) as a 59 weight percent aqueous solution, 3.00 moles of sodium carbonate (Na2C03), 12.00 moles of N-methyl-2-pyrrolidone (NMP), 1.50 moles of sodium acetate (NaOAc) and 9.53 moles of water (H2O). The autoclave was closed and the agitator was started. The contents of the autoclave were deoxygenated by purging with nitrogen gas. The temperature was raised to 200° C. and held for 3 hours with constant stirring. The reaction mixture was quenched with 900 mL. of N-methyl-2-pyrrolidone and 150 mL. of water. The autoclave was opened and contained a crude reaction mixture comprising a slurry of particles in a liquid. The polymeric product was washed with deionized water, heated to 85°-95° C., and filtered to remove water-soluble by-products. The product was dried in a vacuum oven at 150° C. to yield 374.9 grams of product. The inherent viscosity of the product was 0.42 dL/gram.

Inherent viscosities (I.V.) for these polymer samples were determined using a #200 cannon-Fenske routine type viscometer at 30° C. with NMP as the solvent. The concentration of polymer solutions for I.V. determinations was 0.5 grams of polymer per deciliter of solution. Inherent viscosities provide an indication of relative molecular weights of these polymer samples. Higher inherent viscosities are indicative of higher molecular weight polymers.

TABLE I

|  | Run No. | | | | | |
|---|---|---|---|---|---|---|
|  | 1 | 2 | 3 | 4 | 5 | 6 |
| Moles NaSH | 1.50 | 1.50 | 1.50 | 1.50 | 1.50 | 1.50 |
| Moles NaOAc | 1.50 | 1.50 | 1.50 | 1.50 | 1.50 | 1.50 |
| Moles Na2CO3 | 3.00 | 3.00 | 3.00 | 3.00 | 3.00 | 3.00 |
| Moles H2O Added | 9.53 | 9.43 | 9.43 | 9.43 | 9.43 | 9.43 |
| Moles H2O from NaSH | 4.59 | 4.69 | 4.69 | 4.69 | 4.69 | 4.69 |
| Moles NMP | 12.00 | 12.00 | 12.00 | 12.00 | 12.00 | 12.00 |
| Moles BCPS | 1.50 | 1.50 | 1.50 | 1.50 | 1.47 | 1.47 |
| BCPS:NaSH mole ratio | 1.000 | 1.000 | 1.000 | 1.000 | 0.980 | 0.980 |
| Mole % excess BGPS | 0.0 | 0.0 | 0.0 | 0.0 | −2.0 | −2.0 |
| Rxn. Time, hrs @ 200 C. | 3 | 3 | 3 | 3 | 3 | 3 |
| Stir Rate, rpm | 600 | 600 | 600 | 600 | 600 | 600 |
| Quench with Pump: | | | | | | |
| NMP, mL | 900 | 900 | 900 | 900 | 900 | 900 |
| H2O, mL | 150 | 150 | 150 | 150 | 150 | 150 |
| Inherent Viscosity, IV | 0.42 | 0.40 | 0.54 | 0.33 | 0.40 | 0.38 |
| Dry Wt., g | 374.9 | 372.9 | 371.5 | 365.8 | 336.1 | 360.0 |
| % Yield | 100.6 | 100.1 | 99.7 | 98.2 | 90.2 | 96.6 |
| Aqueous Zn Wash | — | Yes | Yes | — | Yes | — |

As can be seen from Table I above, the polymerization generally provides polymer particles with an inherent viscosity (IV) ranging from 0.33 to 0.54.

EXAMPLE II

In this example the runs were carried out by the process of the invention. In each of runs 7-17 of this example the process of run 7, set out below, was followed with minor exceptions as will be set out in Table II that follows this example.

Into a stirred, one liter autoclave constructed of 316 stainless steel was charged 1.50 moles of bis(chlorophenyl) sulfone, 1.50 moles of sodium bisulfide as a 59 weight percent aqueous solution, 3.00 moles of sodium carbonate, 12.00 moles of N-methyl-2-pyrrolidone, 1.50 moles of sodium acetate, 9.53 moles of water and 0.015 mole of 3,3',4,4'-tetrachlorodiphenyl sulfone, branching agent. The autoclave was closed and the agitator was started. The contents of the autoclave were deoxygenated by purging with nitrogen gas. The temperature was raised to 200° C. and held for 3 hours with constant stirring. The reaction mixture was quenched with 900 mL. of N-methyl-2-pyrrolidone and 150 mL. of water. The autoclave was opened and contained a crude reaction mixture comprising a slurry of particles in a liquid. The polymeric product was washed with deionized water, heated to 85°-95° C., and filtered to remove water-soluble by-products. The product was dried in a vacuum oven at 150° C. to yield 376.8 grams of product. The inherent viscosity of the product was 0.35 dL/gram.

EXAMPLE III

In this example the runs were carried out by the process of the invention. In each of runs 18-23 of this example the process of run 19, set out below, was followed with minor exceptions as will be set out in Table III that follows this example.

Into a stirred, one liter autoclave constructed of 316 stainless steel was charged 1.48 moles of bis(chlorophenyl) sulfone, 1.50 moles of sodium bisulfide as a 59 weight percent aqueous solution, 3.00 moles of sodium carbonate, 12.00 moles of N-methyl-2-pyrrolidone, 1.50 moles of sodium acetate, 9.43 moles of water and 0.015 mole of 2,5,4'-trichlorodiphenyl sulfone, branching agent. The autoclave was closed and the agitator was started. The contents of the autoclave were deoxygenated by purging with nitrogen gas. The temperature was raised to 200° C. and held for 3 hours with constant stirring. The reaction mixture was quenched with 900 mL. of N-methyl-2-pyrrolidone and 150 mL. of water. The autoclave was opened and contained a crude reac-

TABLE II

| | Run No. | | | | | | | | | | |
|---|---|---|---|---|---|---|---|---|---|---|---|
| | 7 | 8 | 9 | 10 | 11 | 12 | 13 | 14 | 15 | 16 | 17 |
| Moles NaSH | 1.50 | 1.50 | 1.50 | 1.50 | 1.50 | 1.50 | 1.50 | 1.50 | 1.50 | 1.50 | 1.50 |
| Moles NaOAc | 1.50 | 1.50 | 1.50 | 1.50 | 1.50 | 1.50 | 1.50 | | | | |
| Moles Na2CO3 | 3.00 | 3.00 | 3.00 | 3.00 | 3.00 | 3.00 | 3.00 | 3.00 | 3.00 | 3.00 | 3.00 |
| Moles H2O Added | 9.53 | 9.43 | 9.43 | 9.43 | 9.43 | 9.43 | 9.43 | 9.43 | 9.43 | 9.43 | 9.43 |
| Moles H2O from NaSH | 3.84 | 3.94 | 3.94 | 3.94 | 3.94 | 3.94 | 3.94 | 3.94 | 3.94 | 3.94 | 3.94 |
| Moles NMP | 12.00 | 12.00 | 12.00 | 12.00 | 12.00 | 12.00 | 12.00 | 12.00 | 12.00 | 12.00 | 12.00 |
| Moles BCPS | 1.50 | 1.47 | 1.47 | 1.47 | 1.4700 | 1.4850 | 1.4970 | 1.4970 | 1.4998 | 1.4985 | 1.4997 |
| BCPS:NaSH mole ratio | 1.000 | 0.980 | 0.980 | 0.980 | 0.9800 | 0.9900 | 0.998 | 0.9980 | 0.9999 | 0.9990 | 0.9998 |
| Mole % excess BCPS | 0.0 | −2.0 | −2.0 | −2.0 | −2.0 | −1.00 | −0.2 | −0.2 | −0.0127 | −1.10 | −0.02 |
| Mole Branching Agent[1] | 0.015 | 0.05 | 0.015 | 0.015 | 0.05 | 0.0075 | 0.0015 | 0.0015 | 0.0015 | 0.00075 | 0.00015 |
| Rxn. Time, hrs. @ 200° C. | 3 | 3 | 3 | 3 | 3 | 3 | 3 | 3 | 3 | 3 | 3 |
| Stir Rate, rpm | 600 | 600 | 600 | 600 | 600 | 600 | 600 | 600 | 600 | 600 | 600 |
| Quench with Pump: | | | | | | | | | | | |
| NMP, mL | 900 | 900 | 900 | 900 | 900 | 900 | 900 | 900 | 900 | 900 | 900 |
| H2O, mL | 150 | 150 | 150 | 150 | 150 | 150 | 150 | 150 | 150 | 150 | 150 |
| Inherent Viscosity, IV | 0.35 | 0.82 | 0.53 | 0.52 | 0.87 | 0.97 | 0.16 | 0.51 | 0.50 | 0.62 | 0.51 |
| Dry Wt., g | 376.8 | 368.6 | 370.5 | 370.0 | 363.4 | 366.8 | 360.0 | 370.9 | 372.4 | 373.9 | 369.3 |
| % Yield | 101.2 | 99.0 | 99.5 | 99.3 | 97.6 | 98.5 | 96.6 | 99.6 | 100.0 | 100.4 | 99.1 |
| Aqueous Zn Wash | — | Yes | Yes | Yes | — | — | — | — | — | — | — |

[1]3,3',4,4'-tetrachlorodiphenyl sulfone

As can be seen from Table II above, the polymerization generally provides polymer particles or stringy chunks having an inherent viscosity (IV) ranging from 0.35 to 0.97, with the exception of run 13 which appears to be an anomaly.

tion mixture comprising a slurry of very large particles in a liquid. The polymeric product was washed with deionized water, heated to 85°-95° C., and filtered to remove water-soluble by-products. The product was dried in a vacuum oven at 150° C. to yield 373.1 grams of product. The inherent viscosity of the product was 0.68 dL/gram.

TABLE III

| | Run No. | | | | | |
|---|---|---|---|---|---|---|
| | 18 | 19 | 20 | 21 | 22 | 23 |
| Moles NaSH | 1.50 | 1.50 | 1.50 | 1.50 | 1.50 | 1.50 |
| Moles NaOAc | 1.50 | 1.50 | 1.50 | 1.50 | 1.50 | 1.50 |
| Moles Na2CO3 | 3.00 | 3.00 | 3.00 | 3.00 | 3.00 | 3.00 |
| Moles H2O Added | 9.43 | 9.43 | 9.43 | 9.43 | 9.43 | 9.43 |
| Moles H2O from NaSH | 3.94 | 3.94 | 3.94 | 3.94 | 3.94 | 3.94 |
| Moles NMP | 12.00 | 12.00 | 12.00 | 12.00 | 12.00 | 12.00 |
| Moles BCPS | 1.49 | 1.48 | 1.48 | 1.4887 | 1.4989 | 1.4775 |
| BCPS:MaSH mole ratio | 0.990 | 0.985 | 0.985 | 0.9925 | 0.9993 | 0.9850 |
| Mole % excess BCPS | −1.0 | −1.5 | −1.5 | −0.75 | −0.075 | −1.4996 |
| Mole Branching Agent[1] | 0.015 | 0.015 | 0.015 | 0.0075 | 0.00075 | 0.015 |
| Rxn. Time hrs @ 200 C. | 3 | 3 | 3 | 3 | 3 | 3 |
| Stir Rate, rpm | 600 | 600 | 600 | 600 | 600 | 600 |
| Quench with Pump: | | | | | | |
| NMP, mL | 900 | 900 | 900 | 900 | 900 | 900 |
| H2O, mL | 150 | 150 | 150 | 150 | 150 | 150 |
| Inherent Viscosity, IV | 0.20 | 0.68 | 0.64 | 0.56 | 0.38 | 0.49 |
| Dry Wt., g | 373.1 | 372.3 | 372.9 | 373.9 | 370.0 | 370.0 |

TABLE III-continued

|  | Run No. | | | | | |
| --- | --- | --- | --- | --- | --- | --- |
|  | 18 | 19 | 20 | 21 | 22 | 23 |
| % Yield | 100.2 | 100.0 | 100.1 | 100.4 | 99.3 | 99.3 |
| Aqueous Zn Wash | — | Yes | — | — | — | — |

[1] 2,5,4'-trichlorodiphenyl sulfone.

As can be seen from Table III above the polymerization generally provides polymer particles having an inherent viscosity (IV) ranging from 0.38 to 0.68, with the exception of run 18 which appears to be anomalous.

EXAMPLE IV

In this example the runs were carried out by the process of the invention. In each of runs 24-27 of this example the process of run 24, set out below, was followed with minor exceptions as will be set out in Table IV that follows this example.

A one liter, stirred, 316 stainless steel autoclave was charged with 1.48 moles of bis(chlorophenyl) sulfone, 1.50 moles of sodium bisulfide as a 59 weight percent aqueous solution, 3.00 moles of sodium carbonate, 12.00 moles of N-methyl-2-pyrrolidone, 1.50 moles of sodium acetate, 9.41 moles of water and 0.015 mole of 2,4,4'-trichlorodiphenyl sulfone, branching agent. The autoclave was closed and the agitator was started. The contents of the autoclave were deoxygenated by purging with nitrogen gas. The temperature was raised to 200° C. and held for 3 hours with constant stirring. The reaction mixture was quenched with 900 mL. of N-methyl-2-pyrrolidone and 150 mL. of water. The autoclave was opened and contained a crude reaction mixture comprising a slurry of very large particles in a liquid. The polymeric product was washed with deionized water, heated to 85°-95° C., and filtered to remove water-soluble by-products. The product was dried in a vacuum oven at 150° C. to yield 372.8 grams of product. The inherent viscosity of the product was 0.50 dL/gram.

TABLE IV

|  | Run No. | | | | |
| --- | --- | --- | --- | --- | --- |
|  | 24 | 25 | 26 | 27 | 28 |
| Moles NaSH | 1.50 | 1.50 | 1.50 | 1.50 | 1.50 |
| Moles NaOAc | 1.50 | 1.50 | 1.50 | 1.50 | 1.50 |
| Moles Na2CO3 | 3.00 | 3.00 | 3.00 | 3.00 | 3.00 |
| Moles H2O Added | 9.43 | 9.43 | 9.43 | 9.43 | 9.43 |
| Moles H2O from NaSH | 3.94 | 3.94 | 3.94 | 3.94 | 3.94 |
| Moles NMP | 12.00 | 12.00 | 12.00 | 12.00 | 12.00 |
| Moles BCPS | 1.48 | 1.48 | 1.4775 | 1.4888 | 1.4978 |
| BCPS:MaSH mole ratio | 0.985 | 0.985 | 0.9850 | 0.9925 | 0.9985 |
| Mole % excess BCPS | −1.5 | −1.5 | −1.5 | −0.75 | −0.15 |
| Mole Branching Agent[1] | 0.015 | 0.015 | 0.015 | 0.0075 | 0.0015 |
| Rxn. Time hrs @ 200 C. | 3 | 3 | 3 | 3 | 3 |
| Stir Rate, rpm | 600 | 600 | 600 | 600 | 600 |
| Quench with Pump: | | | | | |
| NMP, mL | 900 | 900 | 900 | 900 | 900 |
| H2O, mL | 150 | 150 | 150 | 150 | 150 |
| Inherent Viscosity, IV | 0.50 | 0.66 | 0.56 | 0.50 | 0.41 |
| Dry Wt., g | 372.8 | 373.9 | 372.4 | 371.8 | 373.9 |
| % Yield | 100.1 | 100.4 | 100.0 | 99.8 | 100.4 |

[1] 2,4,4'-trichlorodiphenyl sulfone.

As can be seen from Table IV above, the polymerization generally provides polymer particles of stringy chunks having an inherent viscosity (IV) ranging from 0.41 to 0.66.

EXAMPLE V

In this example the runs were carried out by the process of the invention. In each of runs 28-31 of this example the process of run 28, set out below, was followed with minor exceptions as will be set out in Table V that follows this example.

A one liter, stirred, 316 stainless steel autoclave was charged with 1.48 moles of bis(chlorophenyl) sulfone, 1.50 moles of sodium bisulfide as a 59 weight percent aqueous solution, 3.00 moles of sodium carbonate, 12.00 moles of N-methyl-2-pyrrolidone, 1.50 moles of sodium acetate, 9.41 moles of water and 0.015 mole of 3,4,4'-trichlorodiphenyl sulfone, branching agent. The autoclave was closed and the agitator was started. The contents of the autoclave were deoxygenated by purging with nitrogen gas. The temperature was raised to 200° C. and held for 3 hours with constant stirring. The reaction mixture was quenched with 900 ml of N-methyl-2-pyrrolidone and 150 mL. of water. The autoclave was opened and contained a crude reaction mixture comprising a slurry of very large particles in a liquid. The polymeric product was washed with deionized water, heated to 85°-95° C., and filtered to remove water-soluble by-products. THe product was dried in a vacuum over at 150° C. to yield 372.9 grams of product. The inherent viscosity of the product was 0.54 dL/gram.

TABLE V

|  | Run No. | | |
| --- | --- | --- | --- |
|  | 29 | 30 | 31 |
| Moles NaSH | 1.50 | 1.50 | 1.50 |
| Moles NaOAc | 1.50 | 1.50 | 1.50 |
| Moles Na2CO3 | 3.00 | 3.00 | 3.00 |
| Moles H2O Added | 9.43 | 9.43 | 9.43 |
| Moles H2O from NaSH | 3.94 | 3.94 | 3.94 |
| Moles NMP | 12.00 | 12.00 | 12.00 |
| Moles BCPS | 1.48 | 1.48 | 1.4775 |
| BCPS:MaSH mole ratio | 0.985 | 0.985 | 0.9850 |
| Mole % excess BCPS | −1.5 | −1.5 | −1.5 |
| Mole Branching Agent[1] | 0.015 | 0.015 | 0.015 |
| Rxn. Time hrs @ 200 C. | 3 | 3 | 3 |
| Stir Rate, rpm | 600 | 600 | 600 |
| Quench with Pump: | | | |

TABLE V-continued

| | Run No. | | |
|---|---|---|---|
| | 29 | 30 | 31 |
| NMP, mL | 900 | 900 | 900 |
| H2O, mL | 150 | 150 | 150 |
| Inherent Viscosity, IV | 0.54 | 0.99 | 0.92 |
| Dry Wt., g | 372.9 | 370.0 | 370.5 |
| A% Yield | 100.1 | 99.3 | 99.5 |
| Aqueous Zn Wash | Yes | Yes | — |

[1]3,4,4'-trichlorodiphenyl sulfone.

As can be seen from Table V above, the polymerization generally provides polymer particles or stringy chunks having an inherent viscosity (IV) ranging from 0.54 to 0.99.

Comparing the results from Table I in which polymer was produced without the use in the reaction mixture of polyhalodiarylsulfone having more than two halogen substituents with the results of Tables II–V it can be seen that the use of these polyhalodiarylsulfones in the reaction mixture provides aromatic sulfide sulfone polymer having greater IV than would be expected from reaction mixtures from which these polyhalodiarylsulfones are excluded.

That which is claimed is:

1. A process for producing branched polyarylene sulfide sulfone, said process comprising:
   (a) contacting a reaction mixture comprising:
   (1) at least one dihaloaromatic sulphone monomer,
   (2) at least one polyhalodiarylsulfone having more than two halogen substituents,
   (3) at least one polymerizable sulfur source selected from the group consisting of alkali metal sulfides and alkali metal hydrosulfides.
   (4) at least one alkali metal carbonate
   (5) at least one organic amide,
   (6) at least one alkali metal carboxylate, and
   (7) water at a temperature and pressure and for a time sufficient to produce branched polyarylene sulfide sulfone, and
   (b) recovering said branched polyarylene sulfide sulfone from said reaction mixture.

2. A process of claim 1 wherein said at least one dihalo aromatic compound is represented by the formula:

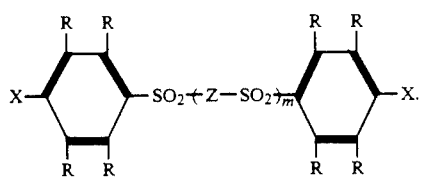

where each X is selected from the group consisting of fluorine, chlorine, bromine and iodine: Z is a divalent radical selected from the group consisting of:

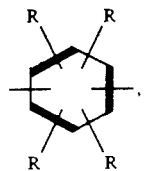

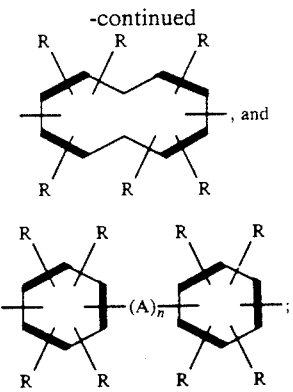

wherein m is 0 or 1; A is selected from the group consisting of oxygen, sulfur, sulfonyl, and $CR_2$; and each R is selected from the group consisting of hydrogen and alkyl radicals having 1 to about 4 carbon atoms, the total number of carbon atoms in all of the R groups in the molecule being 0 to about 12.

3. A process of claim 2 wherein said at least one dihalo aromatic compound from among the group consisting of bis(p-fluorophenyl) sulfone, bis(p-chlorophenyl) sulfone, bis(p-bromophenyl) sulfone, bis(p-iodophenyl) sulfone, p-chlorophenyl p-bromophenyl sulfone, p-iodophenyl-3-methyl-4-fluorophenyl sulfone bis(2-methyl-4-chlorophenyl) sulfone, bis(2,5-diethyl-4-bromophenyl) sulfone, bis(3-isopropyl-4-iodophenyl) sulfone, bis(2,5-dipropyl-4-chlorophenyl) sulfone, bis(2-butyl-4-fluorophenyl) sulfone, bis(2,3,5,6-tetramethyl-4-chlorophenyl) sulfone, 2-isobutyl-4-chlorophenyl-3-butyl-4-bromophenyl sulfone, 1,4-bis(chlorophenylsulfonyl)benzene, 1-methyl-2,4-bis(p-fluorophenylsulfonyl)benzene, 2,6-bis(p-bromophenylsulfonyl)naphthalene, 7-ethyl-1,5-bis(p-iodophenylsulfonyl)naphthalene, 4,4'-bis(p-chlorophenylsulfonyl)biphenyl, bis[p-(p-bromophenylsulfonyl)phenyl] ether, bis[p-(p-chlorophenylsulfonyl)phenyl] sulfide, bis[p-(p-chlorophenylsulfonyl)phenyl] sulfone, bis[p-(p-bromophenylsulfonyl)phenyl]methane, 5,5-bis[3-ethyl-4-(p-chlorophenylsulfonyl)phenyl]nonane, and mixtures thereof.

4. A process of claim 3 wherein said at least one dihaloaromatic compound is bis(p-chlorophenyl) sulfone.

5. A process of claim 1 wherein said at least one alkali metal carbonate is chosen from the group consisting of sodium carbonate, potassium carbonate, rubidium carbonate and cesium carbonate and mixtures thereof.

6. A process of claim 5 wherein said at least one alkali metal carbonate is sodium carbonate.

7. A process of claim 1 wherein said at least one polyhalodiarylsulfone having more than two halogen substituents has halogen constituents chosen from the group consisting of chlorine, bromine, fluorine and iodine and mixtures thereof.

8. A process of claim 7 wherein said at least one polyhalodiarylsulfone having more than two halogen substituents is chosen from among the group consisting of 3,3',4,4'-tetrachlorodiphenyl sulfone, 2,5,4'-trichlorodiphenyl sulfone, 2,4,4'-trichlorodiphenyl sulfone, 3,4,4'-trichlorodiphenyl sulfone and mixtures thereof.

9. A process of claim 1 wherein said at least one polymerizable sulfur source is chosen from the group consisting of sodium sulfide, lithium sulfide, potassium sulfide, rubidium sulfide, cesium sulfide, sodium hydrosulfide, lithium hydrosulfide, potassium hydrosulfide, rubidium hydrosulfide, cesium hydrosulfide, and mixtures thereof.

10. A process of claim 9 wherein said at least one polymerizable sulfur source is sodium sulfide.

11. A process of claim 9 wherein said at least one organic amide is chosen from the group consisting of formamide, acetamide, N-methylformamide, N,N-dimethylformamide, N,N-dimethylacetamide, N-ethylpropionamide, N,N-dipropylbutyramide, 2-pyrrolidone, N-methyl-2-pyrrolidone, ε-caprolactam, N-methyl-ε-caprolactam, N,N'-ethylenedi-2-pyrrolidone, hexamethylphosphoramide, tetramethylurea and mixtures thereof.

12. A process of claim 11 wherein said at least one organic amide is N-methyl-2-pyrrolidone.

13. A process of claim 1 wherein said at least one alkali metal carboxylate is represented by the formula R'CO$_2$Na, where R' is a hydrocarbyl radical selected from the group consisting of alkyl, cycloalkyl, and aryl and combinations thereof and the number of carbon atoms in R1 is within the range of 1 to about 20.

14. A process of claim 13 wherein said at least one alkali metal carboxylate is chosen from the group consisting of alkali metal acetate, alkali metal propionate, alkali metal 2-methylpropionate, alkali metal butyrate, alkali metal valerate, alkali metal hexanoate, alkali metal heptanoate, alkali metal 2-methyloctanoate, alkali metal dodecanoate, alkali metal 4-ethyltetradecanoate, alkali metal octadecanoate, alkali metal beneicosanoate, alkali metal cyclohexanecarboxylate, alkali metal cyclododecanecarboxylate, alkali metal 3-methylcyclopentanecarboxylate, alkali metal cyclohexylacetate, alkali metal benzoate, alkali metal m-toluate, alkali metal phenylacetate, alkali metal 4-phenylcyclohexanecarboxylate, alkali metal p-tolylacetate, alkali metal 4-ethylcyclohexylacetate and the mixtures thereof in which the alkali metals are chosen from among sodium, lithium, potassium, rubidium and cesium.

15. A process of claim 14 wherein said at least one alkali metal carboxylate is sodium acetate.

16. A process of claim 1 further comprising contacting said reaction mixture at a pressure suitable to keep said organic amide in solution, at a temperature of about 160° C. to about 230° C. and for a time in a range of about 10 minutes to about 3 days.

17. A process of claim 1 further comprising contacting said reaction mixture at a pressure suitable to keep said organic amide in solution, at a temperature of about 170° C. to about 210° C. and for a time in a range of about 10 minutes to about 8 hours.

18. A process for producing branched polyarylene sulfide sulfone, said process comprising:
(a) contacting a reaction mixture comprising:
(1) bis(p-chlorophenyl) sulfone monomer,
(2) at least one polyhalodiarylsulfone having more than two halogen substituents chosen from the group consisting of 3,3',4,4'-tetrachlorodiphenyl sulfone, 2,5,4'-trichlorodiphenyl sulfone, 2,4,4'-trichlorodiphenyl sulfone, 3,4,4'-trichlorodiphenyl sulfone and mixtures thereof,
(3) sodium hydrosulfide,
(4) sodium carbonate
(5) N-methyl-2-pyrrolidone,
(6) sodium acetate, and
(7) water at a temperature of about 200° C. for about 3 hours to produce branched polyarylene sulfide sulfone, and
(b) recovering said polyarylene sulfide sulfone from said reaction mixture.

19. A process of claim 1 wherein the mole ratio of organic amide to water is within the range of about 0.4:1 to about 1.3:1, the mole ratio of dihaloaromatic sulfone to polymerizable sulfur source is within the range of about 0.9:1 to about 2:1, the mole ratio of alkali metal carboxylate to polymerizable sulfur source is within the range of about 0.05:1 to about 4:1, the mole ratio of organic amide to polymerizable sulfur source is within the range of about 2:1 to about 24:1, the mole ratio of alkali metal carbonate to polymerizable sulfur source is within the range of about 1:1 to about 3:1, and the mole ratio of polyhalodiarylsulfone having more than two halogen substituents to a polymerizable sulfur source is within the range of about 0.000001:1 to about 0.1:1.

20. A process of claim 19 wherein the mole ratio of organic amide to water is within the range of about 0.5:1 to about 1:1, the mole ratio of dihalo aromatic sulfone to polymerizable sulfur source ranges from about 0.95:1 to about 1.2:1, the mole ratio of alkali metal carboxylate to polymerizable sulfur source ranges from about 0.1:1 to about 2:1, the mole ratio of organic amide to polymerizable sulfur source is within the range of about 4:1 to about 16:1, the mole ratio of alkali metal carbonate to polymerizable sulfur source is within the range of about 1.5:1 to about 2.5:1, and the mole ratio of polyhalodiarylsulfone having more than two halogen substituents to polymerizable sulfur source is within the range of about 0.000005:1 to about 0.05:1.

21. A branched polyarylene sulfide sulfone made by the process of claim 1.

22. A branched polyarylene sulfide sulfone made by the process of claim 18.

* * * * *